US012626289B2

(12) United States Patent
Chen et al.

(10) Patent No.: US 12,626,289 B2
(45) Date of Patent: May 12, 2026

(54) METHOD AND ELECTRONIC DEVICE FOR PROVIDING PRODUCT SEARCH INFORMATION

(71) Applicant: Alibaba Singapore Holding Private Limited, Singapore (SG)

(72) Inventors: Danqiong Chen, Hangzhou (CN); Hongbin Zhao, Hangzhou (CN)

(73) Assignee: Alibaba Singapore Holding Private Limited, Singapore (SG)

( * ) Notice: Subject to any disclaimer, the term of this patent is extended or adjusted under 35 U.S.C. 154(b) by 92 days.

(21) Appl. No.: 18/407,121

(22) Filed: Jan. 8, 2024

(65) Prior Publication Data

US 2024/0232974 A1 Jul. 11, 2024

(30) Foreign Application Priority Data

Jan. 9, 2023 (CN) .......................... 202310029790.5

(51) Int. Cl.
*G06Q 30/00* (2023.01)
*G06Q 30/0601* (2023.01)
(52) U.S. Cl.
CPC ............................... *G06Q 30/0629* (2013.01)
(58) Field of Classification Search
CPC .......... G06Q 30/0601; G06Q 30/0613; G06Q 30/0623; G06Q 30/0629; G06Q 30/0631
See application file for complete search history.

(56) References Cited

U.S. PATENT DOCUMENTS 7,536,324 B2 5/2009 Perkowski
7,865,404 B2 1/2011 Peckover 7,962,750 B1 6/2011 Gruse et al.
7,987,188 B2 * 7/2011 Neylon ................. G06F 16/313
706/45
8,073,777 B2 12/2011 Barry et al.
(Continued)

FOREIGN PATENT DOCUMENTS

CN 103106240 A 5/2013
CN 111522907 A 8/2020
CN 115481332 A 12/2022

OTHER PUBLICATIONS

Chang, Joseph Chee, et al. "Tabs. do: Task-centric browser tab management." The 34th Annual ACM Symposium on User Interface Software and Technology. 2021. (Year: 2021).*

(Continued)

*Primary Examiner* — Christopher B Seibert

(74) *Attorney, Agent, or Firm* — Sheppard Mullin Richter & Hampton LLP

(57) ABSTRACT

This application embodiment discloses a method and electronic device for providing product search information. The method includes: providing a first page for displaying product information, as well as operation options for initiating product search requests based on the products displayed on the first page; in response to a search request initiated through the operation options corresponding to the target product on the first page, a second page is provided. The second page is used to display product search results, which include refined product search results obtained after conducting searches based on the target product. Through this application embodiment, the efficiency of product selection or decision-making can be enhanced.

15 Claims, 4 Drawing Sheets

Server-Side

Client-Side

(56) References Cited

U.S. PATENT DOCUMENTS

| | | | |
|---|---|---|---|
| 8,239,272 | B2 | 8/2012 | Bamborough et al. |
| 8,386,336 | B1* | 2/2013 | Fox .................... G06Q 30/0631 |
| | | | 705/26.7 |
| 8,417,713 | B1* | 4/2013 | Blair-Goldensohn ...................... |
| | | | G06F 16/9535 |
| | | | 705/347 |
| 8,732,025 | B2 | 5/2014 | Gokturk et al. |
| 8,732,030 | B2 | 5/2014 | Gokturk et al. |
| 8,875,215 | B2 | 10/2014 | Reisman |
| 8,954,422 | B2 | 2/2015 | Hasan et al. |
| 9,015,185 | B2 | 4/2015 | Kanigsberg et al. |
| 9,881,332 | B2 | 1/2018 | Bloem et al. |
| 10,068,284 | B1 | 9/2018 | Zisk et al. |
| 11,106,751 | B1 | 8/2021 | Kadayam et al. |
| 11,315,069 | B2 | 4/2022 | Kentris et al. |
| 11,321,761 | B2 | 5/2022 | Walti et al. |
| 11,514,123 | B2 | 11/2022 | Gregori et al. |
| 2001/0021914 | A1* | 9/2001 | Jacobi .................... G06Q 30/02 |
| | | | 705/26.1 |
| 2004/0083203 | A1* | 4/2004 | Kemp .................. G06F 16/954 |
| 2005/0162670 | A1* | 7/2005 | Shuler ............... H04N 1/00408 |
| | | | 358/1.2 |
| 2007/0046675 | A1* | 3/2007 | Iguchi .................. G06T 11/206 |
| | | | 345/441 |
| 2009/0043660 | A1* | 2/2009 | Lee ........................ G06Q 30/02 |
| | | | 705/14.25 |
| 2009/0110089 | A1* | 4/2009 | Green .................. H04L 5/0037 |
| | | | 370/329 |
| 2009/0125371 | A1* | 5/2009 | Neylon ................ G06F 16/313 |
| | | | 707/739 |
| 2009/0171813 | A1* | 7/2009 | Byrne ............... G06Q 30/0623 |
| | | | 707/999.005 |
| 2010/0268661 | A1* | 10/2010 | Levy ...................... G06Q 30/02 |
| | | | 705/347 |
| 2013/0065523 | A1* | 3/2013 | Yun ................... H04M 1/72412 |
| | | | 455/41.1 |
| 2014/0188853 | A1* | 7/2014 | Vuong ............... G06F 16/9038 |
| | | | 707/723 |
| 2014/0188854 | A1* | 7/2014 | Vuong ............... G06Q 30/0641 |
| | | | 707/723 |
| 2014/0188855 | A1* | 7/2014 | Vuong ............... G06F 16/9538 |
| | | | 707/723 |
| 2014/0195931 | A1* | 7/2014 | Kwon .................... G06Q 30/02 |
| | | | 715/753 |
| 2014/0297476 | A1* | 10/2014 | Wang ................... G06F 16/335 |
| | | | 705/26.62 |
| 2014/0351079 | A1* | 11/2014 | Dong ................. G06Q 30/0282 |
| | | | 705/26.7 |
| 2015/0006325 | A1* | 1/2015 | Zhao .................. G06Q 30/0625 |
| | | | 705/26.62 |
| 2015/0006403 | A1 | 1/2015 | Shear et al. |
| 2015/0379732 | A1* | 12/2015 | Sayre, III ............. G06T 11/001 |
| | | | 382/164 |
| 2016/0086248 | A1* | 3/2016 | Ohara ................ G06Q 30/0603 |
| | | | 705/26.64 |
| 2016/0117398 | A1* | 4/2016 | Dakua ................... G06Q 10/10 |
| | | | 707/709 |
| 2016/0162975 | A1* | 6/2016 | Chen ................. G06Q 30/0631 |
| | | | 705/26.7 |
| 2016/0217522 | A1 | 7/2016 | Jnagal et al. |
| 2016/0253734 | A1* | 9/2016 | Ravikant ........... G06Q 30/0629 |
| | | | 705/26.64 |
| 2016/0283998 | A1* | 9/2016 | Pathak ............... G06Q 30/0627 |
| 2016/0321716 | A1* | 11/2016 | Ravikant ........... G06Q 30/0601 |
| 2017/0011015 | A1* | 1/2017 | Dakua ................ G06F 3/04842 |
| 2017/0193997 | A1* | 7/2017 | Chen ...................... G10L 15/26 |
| 2018/0210961 | A1 | 7/2018 | Zeng et al. |
| 2018/0342003 | A1* | 11/2018 | Siddiqui ........... G06Q 30/0627 |
| 2019/0318407 | A1 | 10/2019 | Giridhari et al. |
| 2021/0056608 | A1 | 2/2021 | Kulkarni et al. |
| 2021/0141997 | A1* | 5/2021 | Pinnamaneni .......... G06F 16/81 |
| 2021/0165849 | A1* | 6/2021 | Mohri .................. G06F 16/958 |
| 2021/0174164 | A1 | 6/2021 | Hsieh et al. |

OTHER PUBLICATIONS

Dipin, K. P., Joy Bose, and Sanjoy Pal. "User friendly tab management in web browsers." 2019 16th IEEE Annual Consumer Communications & Networking Conference (CCNC). IEEE, 2019. (Year: 2019).*

Extended European Search Report for European Patent Application No. 24151046.0 mailed on Mar. 20, 2024.

First Office Action and Search Report for Chinese Application No. 202310029790.5, mailed on Nov. 26, 2025, 17 pages.

* cited by examiner

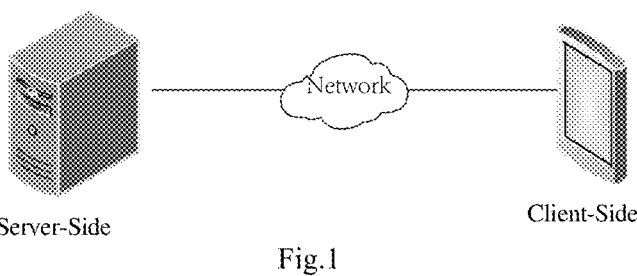

Server-Side　　　　　　　　　　　　Client-Side

Fig.1

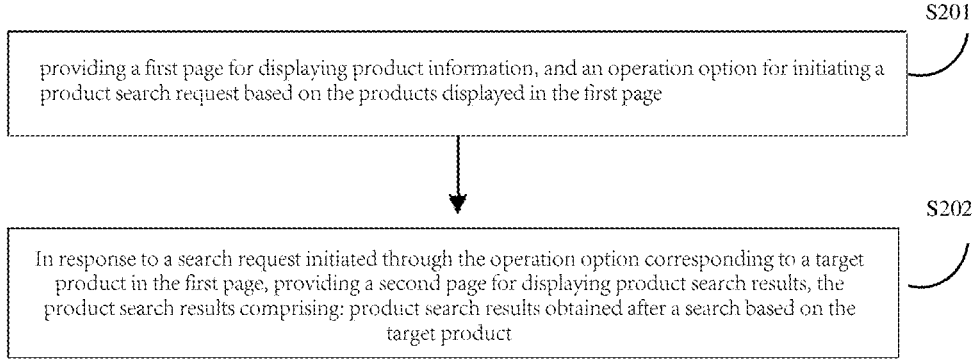

S201 providing a first page for displaying product information, and an operation option for initiating a product search request based on the products displayed in the first page

S202

In response to a search request initiated through the operation option corresponding to a target product in the first page, providing a second page for displaying product search results, the product search results comprising: product search results obtained after a search based on the target product

Fig. 2

METHOD AND ELECTRONIC DEVICE FOR PROVIDING PRODUCT SEARCH INFORMATION

CROSS-REFERENCE TO RELATED APPLICATIONS

The present application claims priority to Chinese Patent Application No. 202310029790.5, filed on Jan. 9, 2023. The above application is incorporated herein by reference in its entirety.

TECHNICAL FIELD

This application relates to the field of providing product search information. Specifically, the present application relates to method and electronic device for providing product search information.

BACKGROUND

In product information systems in eCommerce, one of the important means for buyers to find products is traditional search, including "text search" by entering keywords, "category search" by selecting a specific product category, "image search" by entering or capturing images, and so on. However, in practical applications, there are often situations where user needs are difficult to express accurately through keywords, categories, images, etc., resulting in search results that are still a large and broad collection of products for users, leading to confusion and indecision when selecting products or making further decisions.

SUMMARY

This application provides a method and electronic device for providing product search information, which can improve the efficiency of product selection or decision-making.

This application provides the following solutions:

A method for providing product search information includes:

provide a first page for displaying product information and operation options for initiating product search requests based on the products displayed on the first page, and in response to a search request initiated through an operation option corresponding to a target product in the first page, providing a second page for displaying product search results, wherein the product search results include product search results obtained after searching based on the target product.

In some embodiments, the first page for displaying product information and the operation options for initiating product search requests based on the products on the first page include explicit operation options for initiating product search requests based on the products on the first page.

In some embodiments, the second page includes multiple tabs that are switchable to address various different needs of users when searching for products based on the target product. Different product search results are provided in the tabs based on different search criteria constructed from the target product.

In some embodiments, the tabs include a first tab for conducting similar-product searches for users based on the target product, displaying similar-product search results obtained by searching for similar products based on visual and/or text features.

In some embodiments, the similar products include those that meet certain similarity criteria with the target product in visual and/or text features.

In some embodiments, the tabs include a second tab for users focusing on the target product and choosing from various different merchants offering the same product. It displays search results for the same products obtained by searching for identical products based on visual and/or text features. The identical products include those with the same key features as the target product in visual and/or text features.

In some embodiments, the second tab uses a single-column product card flow format to display search results for the same products. In this format, the text information display space is larger than the image display space and is used to display information about the same products in multiple dimensions.

In some embodiments, the second tab also provides decision action options for the search results of the same products, facilitating decision-making through these options.

In some embodiments, the tabs include a third tab for providing additional search criteria operation options.

In some embodiments, the method further includes submitting the received additional search criteria information to the server in response to the operation option for the server to combine the information of the target product with the additional search criteria information into a target search criteria and initiates product search based on the target search criteria, returning product search results.

In some embodiments, the first page includes preliminary search results obtained by keyword search, category search, or image search, or recommended product information flow pages, or product detail pages.

This application further provides another method for providing product search information, including: receiving a product search request initiated based on the target product displayed on the first page, and conducting a product search based on the target product and returning the obtained product search results to the client device for display on the second page.

In some embodiments, the conducting a product search based on the target product includes constructing multiple different search criteria for various different user needs when searching for products based on the target product. Based on the multiple different search criteria, multiple different product search results are provided so that the client device can provide multiple switchable tabs on the second page, each displaying different product search results.

In some embodiments, the multiple different product search results include: similar-product search results obtained for users based on the target product, including products that meet certain similarity criteria with the target product in visual and/or text features, and/or same-product search results obtained for users focusing on the target product and choosing from various different merchants offering the same product, including products with the same key features as the target product in visual and/or text features.

In some embodiments, the method further includes: if additional search criteria information is received from the user, combining the information of the target product with the additional search criteria information into a target search criteria, and then initiating a product search based on the target search criteria and returning product search results.

In some embodiments, the method further includes: pre-generating a unified feature vector for products in the product catalog, and enabling product search based on the target product using the unified feature vector. The feature vector includes features in visual dimensions and text dimensions. The features in text dimensions include text features obtained based on the product's title or name and/or text features obtained based on structured attribute-value information of the product.

The application further discloses a device for providing product search information. The device include an operation option providing unit for providing a first page for displaying product information and operation options for initiating product search requests based on the products displayed on the first page, and a search results providing unit for providing a second page in response to a search request initiated through the operation option corresponding to a target product on the first page, wherein the second page is for displaying product search results, and the product search results are obtained by searching based on the target product.

The application further discloses another device for providing product search information. The device may include a search request receiving unit for receiving a product search request initiated based on the target product displayed on the first page, and a search results providing unit for conducting a product search based on the target product and returning the obtained product search results to the client device for display on the second page.

The application further discloses a computer-readable storage medium storing a computer program, wherein the program can be executed by a processor to implement any of the methods described above.

The application further discloses an electronic device, which includes one or more processors, and a memory associated with the one or more processors, the memory storing program instructions. When the program instructions are read and executed by the one or more processors, they perform the steps of any of the methods described above.

According to specific embodiments provided by this application, the following technical effects are provided:

Through the embodiments of this application, during the process of displaying products on the first page, operation options for initiating further product search requests based on the products displayed on the first page can be provided. In this way, when users browse the first page and find a target product of interest, but the target product is not sufficient to fully meet their needs, they can send a search request based on the target product through the operation options corresponding to the target product. As a result, the client device can display the second page and show the product search results obtained based on the target product. This way, the "search by product" functionality is realized, allowing users to initiate searches based on products of interest and obtain product search results when it is difficult to accurately express their search needs through keywords, categories, images, etc. This helps users make product selections or decisions in a smaller and more concentrated set of products, thereby improving the efficiency of product selection or decision-making.

Certainly, any product implementing the embodiments of this application does not necessarily need to achieve all of the above-mentioned advantages simultaneously.

BRIEF DESCRIPTION OF THE DRAWINGS

In order to provide a clearer explanation of the technical solutions in the embodiments of this application or in the prior art, a brief introduction of the figures required for the embodiments will be provided below. It is evident that the figures described below are only some embodiments of this application, and those skilled in the art can obtain other figures based on these figures without creative effort.

FIG. 1 is a schematic diagram of the system architecture provided in an embodiment of this application.

FIG. 2 is a flowchart of the first method provided in an embodiment of this application.

DETAIL DESCRIPTION OF THE EMBODIMENTS

Figure 3:
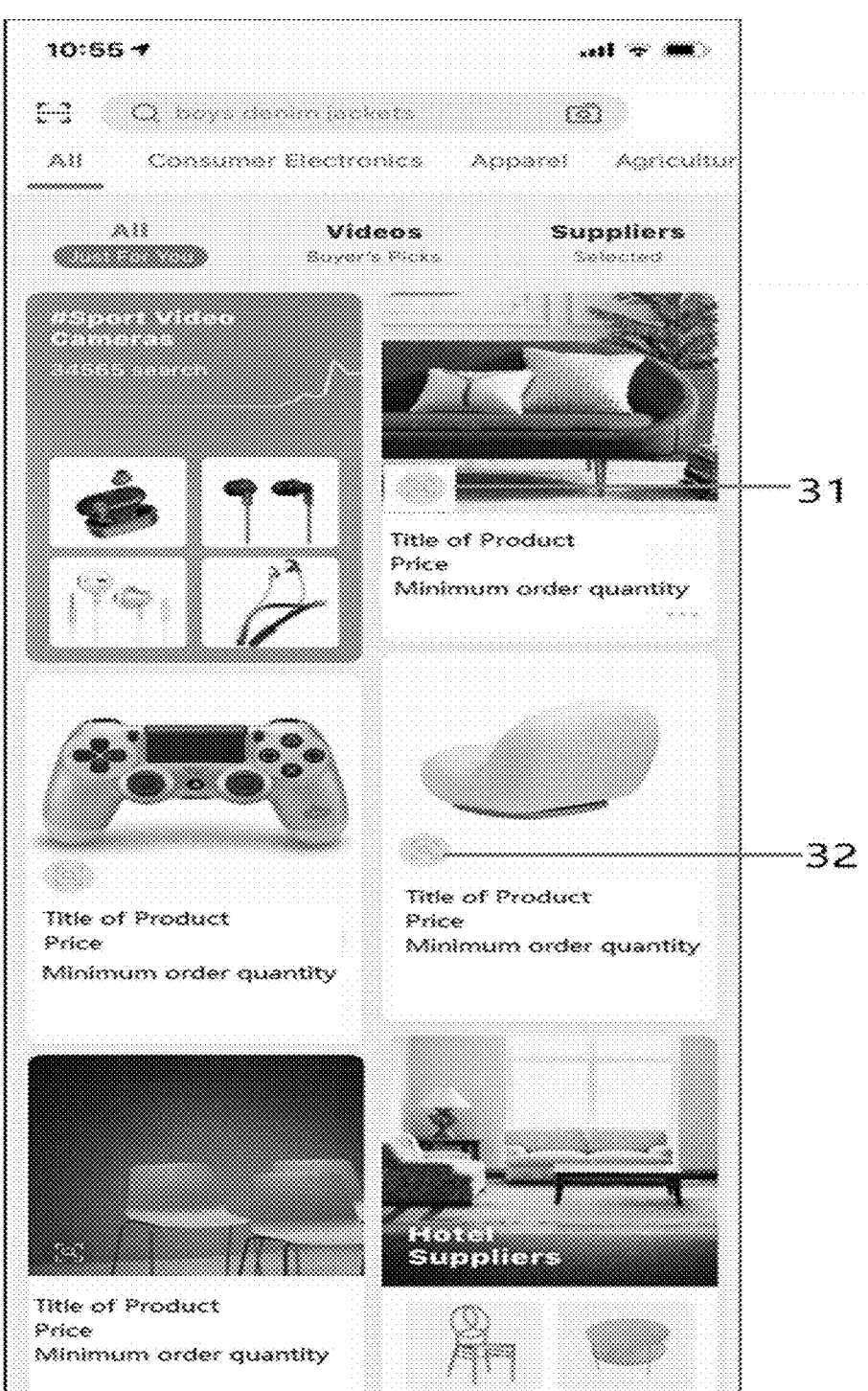
FIG. 3 is a schematic diagram of the first interface provided in an embodiment of this application.

In conjunction with the drawings of the present application's embodiments, a clear and complete description of the technical solution in the present application's embodiments will be provided below. It is evident that the disclosed embodiments are only some of the embodiments in this application, not all of them. Based on the embodiments in this application, all other embodiments obtained by ordinary skilled artisans in this field belong to the scope protected by this application.

First, it needs to be pointed out that in the process of implementing the present application, the inventors found that for buyers, one important means of searching for products is traditional search (text search, category search, image search), and another means is to find interesting products from the recommended product information flow provided by the system. However, whether it is in the search results corresponding to traditional search methods or in other product information flows, there may be the following situations: users may first find a product of interest, but this product may not fully meet their needs. At this point, users may have a need to further refine their search based on this interest product. For example, users may need to find more products that are similar to the interest product and then quickly locate the most suitable product from this smaller set of similar products. Alternatively, they may need to check if other merchants can also provide the same product in order to compare the same product in terms of product quality, price, merchant qualifications, feedback, and so on. This will allow them to quickly and comprehensively understand the lowest price and profit margin of the product, and ultimately make the most satisfying (most business opportunity potential) purchase or wholesale procurement (corresponding to cross-border trade and other scenarios) decisions, and so on.

In addition, according to the granularity of demand (if one or more products browsed by the same user belong to the same "same style cluster" or "similar style cluster," it is counted as one demand), the "number of same style and similar product views" and the "conversion rate" are positively correlated. In other words, if users browse a large number of same style and similar products, the corresponding conversion rate will be higher.

However, in existing technologies, platform-level rules are usually established at the product information flow display level. For example, similar or same style products are scattered for display, which means that if a recommended product information flow includes multiple similar or same style products, these products are usually scattered across different resource slots in the information flow, and the distance between these resource slots may be relatively far. Although this approach makes the products in the information flow appear more differentiated, it also makes it unlikely for users to simultaneously browse two or more similar or same style products in the same-product information flow, thereby restricting the overall improvement of the conversion rate.

In some existing technologies, there is a "find similar" function for users, which means that when users find an interest product in the product information flow, they can use this function to find more products that are similar to the interest product. However, the triggering method for this "find similar" function is usually not obvious. For example, users may need to long-press the product card of the interest product or click on the function option in the lower right corner of the product card to display the "find similar" entry in the function menu. Furthermore, this function is relatively limited and can only satisfy the user's need to find similar products but cannot fulfill the user's need to find the same style products or other refined search needs based on the interest product.

In response to the above situations, in the present application's embodiments, a technical feature is provided to users for further refined product search based on specific interest products. In a specific implementation, during the process of displaying products through the first page (which can be any product information flow page or even a product details page), an operation option (e.g., a button, an icon, or a link) for initiating a product search request can be provided for the displayed products. This operation option can be explicitly displayed, meaning that users do not need to perform a long-press or click on a function option on the product card to display the operation option for initiating refined search (e.g., saving one round of click or long press). Subsequently, while users are browsing the first page, if they find an interest product and need to conduct further refined search based on that interest product, they can directly click on the operation option to initiate a search request. Afterwards, a second page can be provided to display the search results after conducting the refined search based on the interest product. This way, the "search by product" function is implemented, allowing users to initiate a search based on a product of interest and obtain product search results when it is difficult to express their search needs precisely through keywords, categories, images, etc. This helps users make product selections or decisions more efficiently within a smaller and more focused set of products, thus improving the efficiency of product selection or decision-making.

In a preferred embodiment of the present application, considering that there may be various different requirements when users initiate further refined searches based on interest products, different search criteria can be constructed for different requirements during the search. This can result in multiple different refined search results. In this case, multiple switchable tabs can be provided when presenting the refined search results on the second page, and the search results corresponding to different requirements can be classified and displayed in different tabs. This way, if one of the tabs happens to meet the current user's requirements, they can directly obtain the product search results from the corresponding tab.

Additionally, when performing refined product searches based on target products in this specific implementation, a multi-modal feature search method can be used. Unlike existing technologies that rely on product images or product titles for searches, in the present application's embodiments, a unified feature vector can be constructed in advance for products in the product database. This feature vector can incorporate both visual and textual features of the products, allowing for a more comprehensive and three-dimensional portrayal of product characteristics. The textual features can be extracted not only from the product titles but also from the attributes and attribute values of the products in multiple dimensions. For example, for clothing products, the attributes can include material, style, target audience, and so on. The specific values of the products under these attributes can also be integrated into the feature vector. This way, when conducting refined product searches based on the user's interest product, the search can be performed based on this feature vector to obtain refined search results.

From a system architecture perspective, in the present application's embodiments, a function for further refined product search based on interest products can be provided in the product information service system, as shown in FIG. 1. This system can include both client-side (e.g., client device) and server-side (e.g., a server) components. The client-side is mainly used for page display and user interaction. In this application's embodiments, it may also involve providing operation options for initiating refined searches for specific products in the page and displaying refined search results, among other functions. The server-side is mainly used to provide specific data support. In the implementation mode where multi-modal data is used for searching as mentioned earlier, multi-modal fusion processing can be performed in advance on the product information in the product database on the server-side to generate a unified feature vector for each product. Each feature vector can have the same length, and the meanings of dimensions can be the same, facilitating searches for similar or same style products, among other functions.

The following provides a detailed introduction to the specific implementation solutions provided in this application's embodiment.

Embodiment 1

First, in this embodiment of the present application, from the perspective of the client-side as mentioned earlier, a method for providing product search information is provided, as shown in FIG. 2. This method can include:

S201: Providing (e.g., displaying) a first page for displaying product information and an operation option for initiating a product search request based on the products displayed in the first page.

The first page can take various forms. For example, in one case, it can be a preliminary search results page obtained through keyword search, category search, or image search. For example, when a user enters a specific keyword in the search box on the client-side's homepage, the search results page displayed by the client device can, in this application's embodiment, provide operation options for initiating product search requests for each product on that page.

Alternatively, the first page can also be an information flow page for displaying recommended products by the system, or it can be any other information flow page. It can even be a product details page. In other words, after a user clicks on a product in the product search results page or an information flow page, and the details page of that product is displayed, operation options for initiating further refined searches based on that product can also be provided on that details page, and so on.

In the specific implementation, in this embodiment of the present application, the operation options for initiating product search requests based on the products displayed in the first page can be provided explicitly. In other words, these operation options can be displayed directly on the first page and do not require triggering conditions such as long-pressing or clicking on a specific entry by the user. For example, as shown in FIG. 3, this is a page displaying a product information flow, with multiple product information cards displayed, each corresponding to a different product. In each product card, operation options for initiating refined product search requests based on specific products can be provided. For example, these operation options can be as shown at 31, 32, and other locations in FIG. 3, and they can be displayed at the lower left corner of the product image on the product card in a form of an icon or a virtual button. Of course, the specific style or location of the operation options can vary and are not limited here.

S202: In response to a search request initiated through the operation option corresponding to the target product in the first page, providing a second page for displaying product search results, wherein the product search results include results obtained by searching based on the target product.

Since operation options for initiating further search requests based on specific products are provided on the first page as mentioned earlier, users, while browsing the first page, can initiate requests if they are interested in a specific target product and want to conduct further product searches based on that target product. Correspondingly, the client device can forward the request to the server upon receiving it and can carry identification information for the target product. The server can then construct search criteria based on the target product's information and conduct a search, returning the search results. The client device can then display these search results on the second page. In other words, in this embodiment of the present application, users can initiate further product searches based on a product of interest, which is different from existing technologies that rely on methods like "keyword search," "category search," or "image search." The approach used in this application can be referred to as "product search," where more products are searched for starting from a product of interest, allowing users to efficiently find products within a smaller set.

As mentioned earlier, in this case, users initiating further refined product searches based on a specific target product may have specific requirements, and the types of specific requirements may vary for different users in different situations. Therefore, to meet the specific requirements that users may have, in the preferred embodiment of this application, multiple switchable tabs can be provided on the second page. This allows for the provision of different product search results for various different requirements that users may have when conducting product searches based on the target product. These different product search results can be tailored to different requirements and can be obtained by constructing different search criteria based on the target product.

In other words, in this embodiment of the present application, when initiating a product search based on a specific product, search criteria can be constructed based on the target product, but the specific search criteria constructed may be different for different user requirements. Therefore, in this embodiment of the present application, when users initiate further refined searches based on a product of interest, their potential needs can be categorized, and then different search results can be provided for each category of requirements. For example, specific categories of requirements can include, as mentioned earlier, finding more products similar to the product of interest, or finding the same style products based on the product of interest for comparison among different merchants offering the product. For these two types of requirements, since searching for similar products or the same style products can be directly accomplished based on the information of the specific product of interest, the corresponding search results can be presented directly after users initiate the search. These search results can also be presented in different tabs. Additionally, there may be situations where users do not want to find similar products or the same style products, or they find that there are no suitable products among similar or the same style products. In such cases, there may be a third type of requirement, where users need to supplement some search criteria based on the current product of interest. For example, they can add more keywords to further describe their requirements or even add images, and so on.

Therefore, based on the above situations, in this embodiment of the present application, three tabs can be provided, corresponding to the three types of requirements mentioned earlier. In the tabs corresponding to similar products and identical products, the search results for similar or identical products can be directly presented. The third tab can provide specific operational options for inputting additional search criteria, allowing users to supplement some search criteria, combine them with previously selected items of interest, formulate new search criteria, and conduct searches, thereby providing search results.

Figure 4:
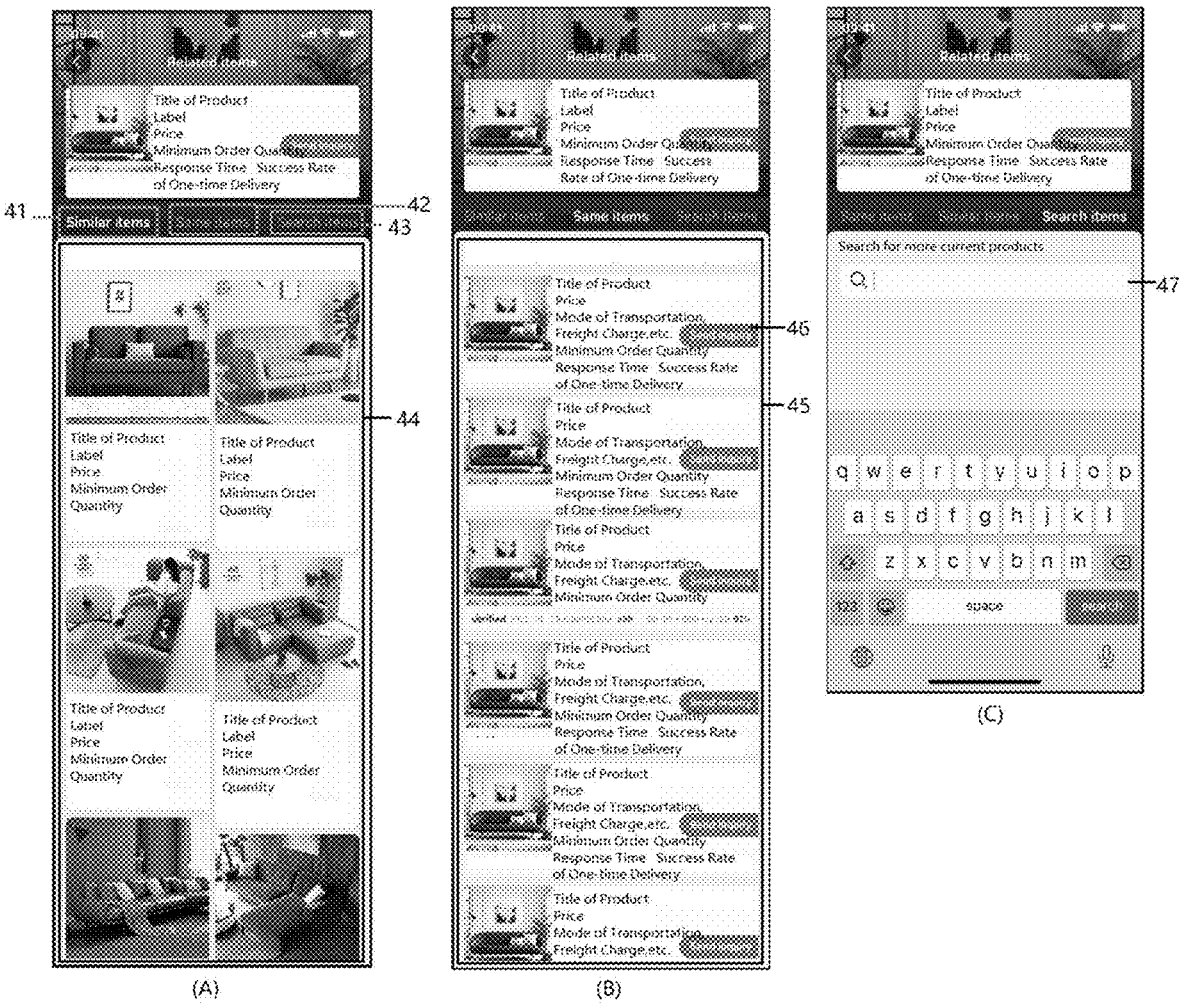
FIG. 4 is a schematic diagram of the second interface provided in an embodiment of this application.

In other words, in the specific implementation, the tabs can include a first tab, which can be used to address the user's demand for selecting products based on the target product and diverging to more similar products. This tab displays the search results for similar products obtained by conducting a similar product search based on the target product. Specifically, regarding similar products, these can be products that satisfy certain conditions in terms of visual and/or textual features similarity with the target product. Therefore, when constructing the search criteria, it can also be based on the definition of these similar products. For example, as shown in FIG. 4 (A), where 41, 42, and 43 correspond to the tab options for the three tabs, namely "Similar Items," "Same Items," and "Search Items." When the tab option "Similar Items" is selected, as indicated at 44, it represents the aforementioned first tab, which is used to display information about similar products.

Furthermore, the specific tabs can also include a second tab, where the second tab is used for the user's requirement to focus on the target product and select a merchant from among multiple different merchants offering the same product. It displays the results of a search for the same product based on the target product. In this embodiment, the specific same product can be: products that share the same key features as the target product in terms of visual and/or textual characteristics. Regarding the key features, different industries and categories may have different definitions. For example, for clothing products, when defining the same product, key features may include visual dimensions, material dimensions, target audience dimensions, and so on. In specific implementations, corresponding relationships between different industries or categories and key feature dimensions can be included. This way, when searching for the same product, the key feature dimensions corresponding to the industry or category of the target product can be determined, and products with the same features as the target product in these key feature dimensions can be retrieved from the product database as the same product for that target product, and so on. For example, as shown in FIG. 4(B), when the second tab labeled "Same Items" is selected, the content of the second tab can be displayed at location 45, which includes information about multiple same products of the current target product.

In other words, in this embodiment of the present application, a distinction is made between similar products and same products, and they are displayed in different tabs. This helps users find products that meet their specific needs more accurately. Additionally, since users have different requirements when viewing similar products and same products, the page layout in specific tabs can also differ.

For example, when displaying information about similar products in the first tab, because users' intent is to explore more similar products based on the target product, their intent may not be very clear. Even if they find other products of interest in the first tab, they often need to enter the product details page to view more information before making a decision (whether to purchase, etc.). Therefore, as shown in FIG. 4(A), in the first tab, product cards for various similar products can be displayed in a "two-column flow" format with multiple product cards. Each product card can be laid out in a "image above text below" format, with more space dedicated to displaying images than text to emphasize the visual information, allowing users to quickly determine their interest in the products based on the images.

In contrast, when displaying same products in the second tab, because users have already focused on the target product (i.e., they have already determined that the target product meets their needs), they need to compare details such as product quality, price, minimum order quantity, shipping method, shipping cost, response time, one-time delivery success rate, merchant qualifications, and feedback from different merchants offering the same product. In this situation, since the product images for same products are typically the same, users are more likely to compare the text information among the same products. Therefore, a "single-column product card flow" format can be used to display the results of the same product search in multiple product cards, where the text information display space in each product card is larger than the image display space. This space is used to display information about the same products in various dimensions, making it easier for users to compare the same products based on multiple dimensions. For example, as shown in FIG. 4(B), each product card can be laid out in a "text on the right, image on the left" format, with a larger space for text display in the card. For example, compared to what is shown in FIG. 4(A), which displays information such as the title, price, and minimum order quantity for each product, the state shown in FIG. 4(B) can display more dimensions of information for each product, such as the title, price, shipping method, shipping cost, minimum order quantity, response time, one-time delivery success rate, and more, making it easier for users to compare.

Furthermore, when displaying same products, user requirements are usually more focused. Their main purpose in initiating a refined search is to compare among multiple same products. In this case, because the text information displayed in the second tab includes information on various dimensions of each same product, these dimensions are typically the dimensions that users commonly pay attention to when comparing merchants. Therefore, after users complete the comparison based on the information displayed in the second tab, there is a relatively high probability that they can make a decision directly. In other words, they can make a purchase decision or procurement decision directly based on the information displayed in the second tab, without the need to click into specific product details pages to browse more information. Therefore, in the preferred embodiment of this application, the second tab can also be used to provide decision action options (in a form of a second icon or a second button) for the same-product search results. This way, after users make a decision based on the content displayed in the second tab, they can execute the decision directly through the provided decision action options by clicking or triggering the corresponding option (icon). The specific decision action options can vary and may include options to add the same-product search results to the shopping cart, make a purchase, or, in procurement and wholesale scenarios, initiate an inquiry request to the merchant, and so on. For example, as shown at location 46 in FIG. 4(B), the "Send Inquiry" operation option is provided in the second tab for procurement scenarios.

Additionally, as mentioned earlier, the specific tabs can also include a third tab. Specifically, the third tab can provide operation options for supplementing search criteria. This allows users to supplement additional search criteria after entering search criteria information. The information about the target product and the supplemental search criteria information can be combined to create target search criteria. Based on these target search criteria, a new product search can be initiated, and the search results can be returned. For example, as shown in FIG. 4(C), when the third tab is selected, operation options for supplementing additional search criteria can be displayed at location 47.

It may be noted that in actual applications, in addition to the tabs corresponding to similar products, same products, and supplemental search criteria mentioned earlier, other tabs can also be included to meet other user requirements when searching based on the target product. For example, for clothing products, tabs for "matching products," "same-store products," and so on can also be provided, without limitation.

The above description mainly introduces the solution provided in this embodiment from the perspective of the interface display and interaction on the client side. As for the server side, it mainly provides support from data aspects. Specifically, it can construct search criteria based on the specific target product and search for products that meet the search criteria in the product database, returning the results for display on the client side. In this embodiment, since information about a specific product is typically rich when there is a known target product, including visual and textual information such as images, product titles, and structured attributes with corresponding attribute values, these structured attributes are often in the form of key-value pairs. For example, for a clothing product, "material" is an attribute, and "cotton" is a specific attribute value, and so on. Therefore, to obtain more accurate search results, feature vectors for products can be constructed based on this multimodal information. Specifically, feature vectors with a unified vector space can be generated in advance for products in the product database (which can be the full product database in the system or subsets, depending on the specific application needs), in order to conduct a product search based on the target product according to the unified feature vector. Specific feature vectors include features in the visual dimension of the product as well as features in the text dimension. The text dimension features may include text features obtained based on the title or name of the product and/or text features obtained based on structured attributes and attribute-value information of the product. In this way, through the expression of these multi-modal features, a more comprehensive representation of specific products can be achieved, thereby enhancing the quality of fine-tuned search results.

This allows products to be expressed using feature vectors of the same length (with the same number of dimensions), and the numerical values on corresponding dimensions can have the same meanings. In this way, similarity between different products can be determined based on the calculation of vector distances. When searching for similar products, the distances between feature vectors of multiple products in the product database and the feature vector of the current target product can be calculated to represent the similarity between products, and products with similarity greater than a certain threshold can be considered similar products of the target product. Additionally, the meanings of each feature dimension in the feature vectors can be stored. When searching for the same products, the category or industry to which the target product belongs can be determined first, and then the key feature dimensions used to define the same products in that category or industry can be identified. From the feature values on these key feature dimensions in the feature vectors of specific products, same products can be retrieved using a comparison approach.

Furthermore, when users input supplemental search criteria, when constructing search criteria based on the information of the target product and the supplemental search criteria information, the original feature vector of the target product can be further fused with the supplemental search criteria information to generate a new feature vector (certainly, the new feature vector and the original feature vector of the product also share a unified vector space). This new feature vector and the feature vectors corresponding to products in the product database can then be used to calculate similarity and obtain search results.

In summary, in this embodiment, during the process of displaying products through the first page, operation options for initiating further product search requests based on the products displayed in the first page can be provided. This way, when users browse the first page and discover a target product of interest that may not fully meet their needs, they can initiate a search request based on that target product using the operation options associated with it. Correspondingly, the client device can display the second page and show the product search results based on the target product. This approach enables the "search by product" functionality, allowing users to initiate searches based on a product of interest and obtain product search results when they find it difficult to express their search needs precisely using keywords, categories, images, etc. This helps users make product selections or decisions more efficiently within a smaller and more focused set of products.

Embodiment 2

Figure 5:
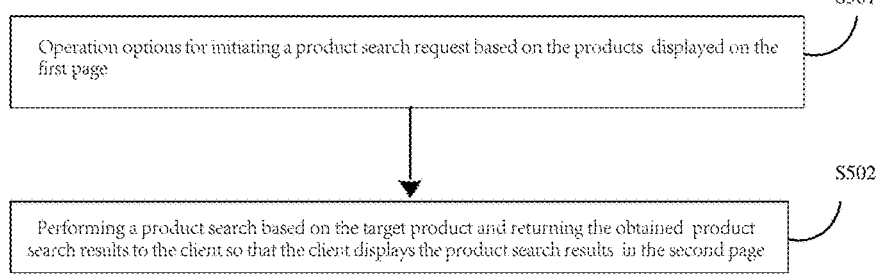
FIG. 5 is a flowchart of the second method provided in an embodiment of this application.

Embodiment two corresponds to embodiment one. From the server's perspective, it provides a device for providing product search information, as shown in FIG. 5, and the method can include:

S501: Receiving a product search request initiated based on the target product displayed on the first page.

S502: Conducting a product search based on the target product and returning the obtained product search results to the client device for display on the second page.

Specifically, the server can construct multiple different search criteria for various user needs when conducting a product search based on the target product. Based on these multiple different search criteria, it provides multiple different product search results to the client device. The client device can provide multiple switchable tabs on the second page, each tab displaying different product search results.

Specifically, the different product search results can include:

For users' needs to conduct similar-product searches based on the target product, the obtained similar-product search results. In this case, similar products include products that meet the conditions of similarity with the target product in terms of visual and/or textual characteristics. For users who have focused on the target product and need to select a merchant from multiple different merchants offering the same product, the obtained same-product search results. In this case, same products include products with the same key features as the target product in terms of visual and/or textual characteristics.

Additionally, if supplemental search criteria information is received from the user, the information of the target product and the supplemental search criteria information can be combined to create target search criteria. Then, a new product search can be initiated based on these target search criteria, and the search results can be returned.

Specifically, the server can also generate unified feature vectors for products in the product database in advance. These feature vectors allow products to be represented using vectors of the same length with the same number of dimensions. This enables the calculation of product similarity based on vector distances. When conducting similar-product searches, the distances between feature vectors of multiple products in the product database and the feature vector of the current target product can be calculated to represent the similarity between products. Products with similarity greater than a certain threshold can be considered similar products of the target product. The meanings of each feature dimension in the feature vectors can also be stored. When conducting same-product searches, the category or industry to which the target product belongs can be determined, and then the key feature dimensions used to define same products in that category or industry can be identified. Same products can be retrieved based on the feature values on these key feature dimensions in the feature vectors of specific products.

In summary, in this embodiment, during the process of displaying products on the first page, operation options for initiating further product search requests based on the products displayed on the first page can be provided. This allows users to initiate a search request based on a target product they find interesting when browsing the first page. Correspondingly, the client device can display the second page and show the product search results based on the target product. This approach enables the "search by product" functionality, allowing users to initiate searches based on a product of interest when they find it challenging to express their search needs precisely using keywords, categories, images, etc. This helps users make product selections or decisions more efficiently within a smaller and more focused set of products.

Regarding the undisclosed part in embodiment two, reference can be made to embodiment one and other sections of this specification for details: it will not be reiterated here.

It should be noted that this embodiment may involve the use of user data. In practical applications, the use of specific user personal data in the solutions described in this document may be carried out within the scope permitted by applicable laws and regulations of the country (e.g., with explicit user consent, effective notification to the user, etc.).

Figure 6:
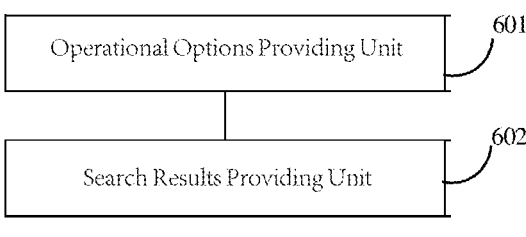
FIG. 6 is a schematic diagram of the first device provided in an embodiment of this application.

In connection with the corresponding embodiments of the methods mentioned earlier, this embodiment also provides a device for providing product search information, as shown in FIG. 6. The device may include:

An operation option providing unit 601 for providing a first page for displaying product information and operation options for initiating a product search request based on the displayed products on the first page.

A search result providing unit 602 for responding to a search request initiated based on the target product on the first page corresponding to the operation options, providing a second page for displaying product search results. The product search results include results obtained from searching based on the target product.

Specifically, the operation option providing unit can be used for explicitly providing options for initiating a refined product search request based on the products displayed on the first page.

In the second page, there are multiple switchable tabs associated with different needs for users based on the target product when conducting a product search. Different product search results are provided in multiple tabs based on different search criteria constructed according to the target product.

Specifically, the tabs include a first tab for displaying results obtained from a similar product search based on the target product, where similar products meet specified conditions in visual and/or text features.

Alternatively, the tabs include a second tab for displaying results obtained from a search for identical products based on the target product, allowing users to select a merchant from multiple different merchants offering the same product. Identical products have the same key features in visual and/or text features.

In the second tab, the results of the identical product search are displayed in a single-column card flow, where the text information display space in the card is larger than the image display space, used to display information about identical products in multiple dimensions.

Moreover, the second tab can also be used to provide decision action point options for the identical product search results, enabling users to make decisions through these options.

These decision action point options include options for adding identical product search results to the shopping cart, purchasing, or initiating an inquiry request to the merchant in the case of wholesale procurement scenarios.

In addition, the tabs include a third tab for providing operation options for supplemental search criteria.

The device may further include a supplemental search criteria receiving unit for responding to supplemental search criteria information received through this operation option, submitting the received supplemental search criteria information to the server. This allows the server to combine the information of the target product with the supplemental search criteria information to form target search criteria and initiate a product search based on the target search criteria, returning product search results.

The first page may include preliminary search results obtained based on keyword search, category search, or image search, or recommended product information flow pages, or product detail pages.

Figure 7:
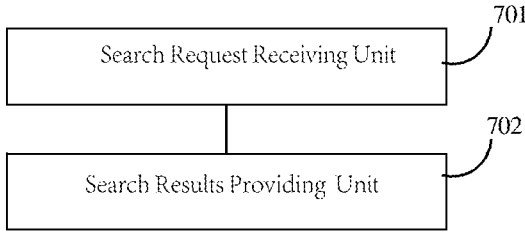
FIG. 7 is a schematic diagram of the second device provided in an embodiment of this application.

Corresponding to Embodiment Two, this application provides a device for providing product search information, as shown in FIG. 7. The device can include:

Search request reception unit 701: This unit is used to receive product search requests initiated based on the target product displayed on the first page.

Search result providing unit 702: This unit conducts a product search based on the target product and returns the obtained product search results to the client device for display on the second page.

Specifically, the search result providing unit can be used to:

Construct multiple different search criteria for various user needs when conducting a product search based on the target product.

Provide multiple different product search results based on these multiple different search criteria. This allows the client device to provide multiple switchable display tabs on the second page, each of which displays different product search results.

These different product search results can include:

Product search results for users who want to conduct similar-product searches based on the target product. This includes similar products that meet the conditions of similarity with the target product in terms of visual and/or textural features.

Product search results for users who focus on the target product and need to select a merchant from multiple different merchants offering the same product. This includes same products with the same key features as the target product in terms of visual and/or textural characteristics.

Additionally, the device can also include:

Supplemental search criteria reception unit: This unit is used to combine the information of the target product with supplemental search criteria information if received from the user to create target search criteria.

Re-search unit: This unit is used to initiate a new product search based on the target search criteria and return product search results.

Furthermore, the device can include:

Feature vector storage unit: This unit is used to generate unified feature vectors for products in the product database in advance. These feature vectors include visual and textural features of the products, such as text features obtained from the product's title or name and text features obtained from structured attribute-value information of the product.

Additionally, this application provides a computer-readable storage medium that stores computer programs. When executed by a processor, these programs implement the steps of any of the methods described in the embodiments of this application.

Furthermore, an electronic device is provided, including:

one or more processors;

a memory associated with the one or more processors, where the memory stores program instructions. When the program instructions are read and executed by the one or more processors, they perform the steps of any of the methods described in the embodiments of this application.

Figure 8:
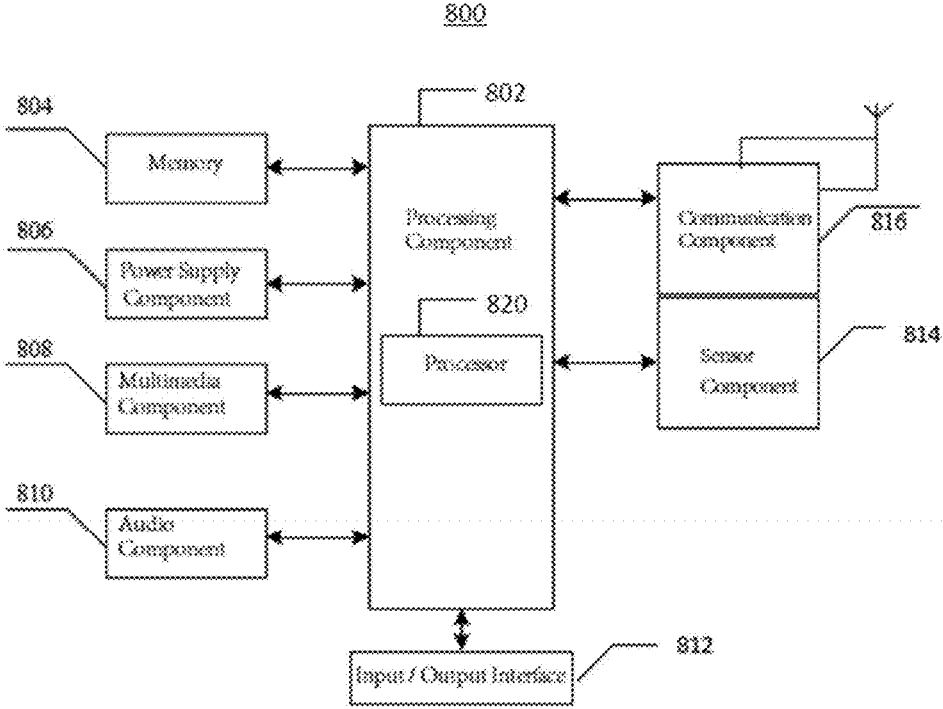
FIG. 8 is a schematic diagram of an electronic device provided in an embodiment of this application.

In one example, FIG. 8 illustrates the architecture of an electronic device, such as device 800, which can be a mobile phone, computer, digital broadcasting terminal, messaging device, game console, tablet device, medical device, fitness device, personal digital assistant, aircraft, and more.

Device 800 can include components such as a processing component 802, memory 804, power component 806, multimedia component 808, audio component 810, input/output (I/O) interface 812, sensor component 814, and communication component 816.

The processing component 802 typically controls the overall operation of the device 800, handling operations associated with display, phone calls, data communication, camera operations, and recording operations. The processing component 802 may include one or more processors 820 to execute instructions and carry out all or part of the steps of the method provided by the disclosed technical solution. Additionally, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support the operation of the device 800. Examples of this data include instructions for any applications or methods operating on the device 800, contact data, phonebook data, messages, images, videos, and more. Memory 804 can be implemented by any type of volatile or non-volatile storage devices or their combinations, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic storage, flash memory, disk or optical disk.

Power component 806 provides power to various components of device 800. Power component 806 can include a power management system, one or more power sources, and other components related to generating, managing, and distributing power for device 800.

The multimedia component 808 includes a screen that serves as an output interface between the device 800 and the user. In some embodiments, the screen may comprise a Liquid Crystal Display (LCD) and a Touch Panel (TP). If the screen includes a touch panel, it can be implemented as a touchscreen to receive input signals from the user. The touch panel includes one or more touch sensors to detect touches, slides, and gestures on the touch panel. The touch sensors may not only detect the boundaries of touch or slide actions but also measure the duration and pressure associated with touch or slide operations. In some implementations, the multimedia component 808 includes a front camera and/or a rear camera. When the device 800 is in an operational mode, such as shooting or video mode, the front and/or rear cameras can receive external multimedia data. Each front and rear camera can be a fixed optical lens system or have focal length and optical zoom capabilities.

Audio component 810 is configured to output and/or input audio signals. For example, audio component 810 may include a microphone (MIC) that can receive external audio signals when device 800 is in operation modes such as call mode, recording mode, and voice recognition mode. The microphone is configured to receive external audio signals. The received audio signals can be further stored in the memory 804 or sent via the communication component 816. In some embodiments, audio component 810 may also include a speaker for outputting audio signals.

I/O interface 812 provides an interface between processing component 802 and peripheral interface modules, such as a keyboard, touch wheel, buttons, and others. These buttons can include, but are not limited to, home button, volume button, power button, and lock button.

Sensor component 814 includes one or more sensors for assessing various aspects of the state of device 800. For example, sensor component 814 can detect whether device 800 is open/closed, relative positioning of components such as the display and small keyboard of device 800, changes in the position of device 800 or a component thereof, presence or absence of user contact with device 800, orientation of device 800, acceleration/deceleration of device 800, and temperature changes of device 800. The sensor component 814 may include a proximity sensor configured to detect the presence of nearby objects without any physical contact. The sensor component 814 may also include light sensors, such as CMOS or CCD image sensors, for use in imaging applications. In some implementations, the sensor component 814 may further include acceleration sensors, gyroscope sensors, magnetic sensors, pressure sensors, or temperature sensors.

Communication component 816 is configured to facilitate wired or wireless communication between device 800 and other devices. Device 800 can access wireless networks based on communication standards such as Wi-Fi or mobile communication networks like 2G, 3G, 4G/LTE, 5G, etc. In an exemplary implementation, the communication component 816 receives broadcast signals or broadcast-related information from an external broadcast management system via a broadcast channel. In some embodiments, communication component 816 can also include a near-field communication (NFC) module for facilitating short-range communication. For example, the NFC module can be implemented based on radio-frequency identification (RFID) technology, Infrared Data Association (IrDA) technology, Ultra-Wideband (UWB) technology, Bluetooth (BT) technology, and other related technologies.

In some exemplary embodiments, device 800 can be implemented using one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components to perform the methods described herein.

In some exemplary embodiments, a non-transitory computer-readable storage medium including instructions is provided. For example, memory 804 can store instructions that, when executed by processor 820, perform the steps of the methods provided herein. For example, the non-transitory computer-readable storage medium may include ROM, random-access memory (RAM), CD-ROM, magnetic tape, floppy disk, optical data storage devices, and the like.

From the description of the above embodiments, those skilled in the art can clearly understand that the technical personnel in this field can implement the present application by means of software with the necessary general hardware platform. Based on this understanding, the essential part or the contribution to the existing technology of the technical solution in this application can be embodied in the form of a software product. This computer software product can be stored in a storage medium such as ROM/RAM, a disk, or an optical disk, including a plurality of instructions for causing a computer device (which can be a personal computer, server, or network device, etc.) to execute the method of various embodiments or certain parts of the embodiments described in this application.

The descriptions of the embodiments provided in this application are presented in a progressive manner. Similar or identical parts between different embodiments can be cross-referenced. Each embodiment focuses on the differences from other embodiments. In particular, for system or system embodiments, as it is fundamentally similar to the method embodiments, the description is relatively simple, and relevant parts can be referred to in the description of the method embodiments. The above-described systems and system embodiments are illustrative, and the units described as separate components may or may not be physically separated or may be displayed as single units. Some or all of the modules displayed as units can be located in one place or distributed across multiple network units. Depending on actual needs, some or all modules may be selected to implement the purpose of the embodiments described herein. A person skilled in the art can understand and implement the core concepts of the present application without requiring creative effort.

The above description provides detailed explanations of the methods and electronic devices for providing product search information according to the embodiments of the present application. Specific examples have been used to illustrate the principles and implementation of the embodiments. The descriptions of the embodiments are provided to facilitate understanding of the principles of the present application, and variations and modifications will be apparent to those skilled in the art. Therefore, the content of this specification may not be understood as limiting the scope of the present application.

What is claimed is:

1. A method for providing product search information in a computing environment comprising a client device and a server, comprising:

displaying, via a graphical user interface (GUI) on the client device, a first page comprising a plurality of product representations, each product representation corresponding to a target product and comprising an operation option for initiating a product-based search request based on the target product displayed on the first page; and detecting, by the client device, a search request initiated through the operation option of the target product on the first page;

transmitting, by the client device to the server, the product-based search request, causing the server to construct a plurality of different search criteria constructed based on the target product;

receiving, by the client device from the server, product search results generated from the plurality of different search criteria constructed based on the target product; and displaying, via the GUI on the client device, a second page comprising the product search results, wherein the second page comprises a plurality of switchable tabs on the GUI, the plurality of switchable tabs respectively corresponding to the product search results of the plurality of different search criteria.

2. The method of claim 1, wherein the plurality of switchable tabs include a first tab for displaying similar-product search results that comprises products similar to the target product, wherein the products similar to the target product meet a condition of similarity in visual and/or textual features of the target product.

3. The method of claim 1, wherein the plurality of switchable tabs include a second tab for displaying same-product search results comprising the same products as the target product, wherein the same products as the target product include products that have the same features in visual and/or textual characteristics as the target product.

4. The method of claim 3, wherein the second tab includes a product card which uses a single-column product card flow format for displaying the same-product search result, in which text information display space is greater than image display space, wherein the text information display space displays information of the same products in various dimensions.

5. The method of claim 3, wherein the second tab further comprises decision-making action options corresponding to the same-product search results, and the decision-making action options allow users to make decisions.

6. The method of claim 1, wherein the plurality of switchable tabs include a third tab to provide operation options for supplementing search criteria, and the method further comprising:

submitting supplemental search criteria information received through the operation options in the third tab to a server, so that the server combines the information of the target product with the supplemental search criteria information to form updated search criteria; and reinitiating the product search request based on the updated search criteria and displaying the search results.

7. A method for providing product search information, comprising:

receiving, by a server, a product search request initiated by a client device based on a target product displayed on a first page via a graphical user interface (GUI) on the client device;

constructing, by the server, a plurality of different search criteria based on the product search request;

conducting, by the server, a plurality of product searches using the plurality of different search criteria, searching for products based on the target product; and returning product search results of the plurality of product searches to the client device, causing the client device to display, via the GUI on the client device, the product search results on a second page comprising a plurality of switchable tabs respectively corresponding to the product search results.

8. The method according to claim 7, wherein the product search results include similar-product search results comprising similar products based on the target product, where the similar products include products that meet a condition of similarity in visual and/or textual features with the target product; and/or, wherein the product search results include same-product search results obtained for users who focus on the target product and is open to choose from different merchants offering the same products, where the same products include products that have same key features in visual and/or textual characteristics as the target product.

9. The method according to claim 7, further comprising:

in response to receiving supplemental search criteria information submitted by the client device, combining the information of the target product with the supplemental search criteria information to form updated search criteria, reinitiating product search based on the updated search criteria, and returning product search results.

10. A non-transitory computer-readable storage medium configured with instructions executable by one or more processors of a client device to cause the one or more processors to perform operations comprising:

displaying, via a graphical user interface (GUI) on the client device, a first page comprising a plurality of product representations, each product representation corresponding to a target product and comprising an operation option for initiating a product-based search request based on the target product displayed on the first page; and detecting, by the client device, a search request initiated through the operation option of the target product on the first page;

transmitting, by the client device to a server, a product-based search request, causing the server to construct a plurality of different search criteria constructed based on the target product;

receiving, by the client device from the server, product search results generated from the plurality of different search criteria constructed based on the target product; and displaying, via the GUI on the client device, a second page comprising the product search results, wherein the second page comprises a plurality of switchable tabs on the GUI, the plurality of switchable tabs respectively corresponding to the product search results of the plurality of different search criteria.

11. The non-transitory computer-readable storage medium of claim 10, wherein the plurality of switchable tabs include a first tab for displaying similar-product search results that comprises products similar to the target product, wherein the products similar to the target product meet a condition of similarity in visual and/or textual features of the target product.

12. The non-transitory computer-readable storage medium of claim 10, wherein the plurality of switchable tabs include a second tab for displaying same-product search results comprising the same products as the target product, wherein the same products as the target product include products that have the same features in visual and/or textual characteristics as the target product.

13. The non-transitory computer-readable storage medium of claim 12, wherein the second tab includes a product card which uses a single-column product card flow format for displaying the same-product search result, in which text information display space is greater than image display space, wherein the text information display space displays information of the same products in various dimensions.

14. An electronic device, characterized in that it includes: one or more processors; and a memory associated with the one or more processors, the memory storing program instructions, where the program instructions, when read and executed by the one or more processors, perform operations comprising:

receiving, by the electronic device, a product search request initiated by a client device based on a target product displayed on a first page via a graphical user interface (GUI) on the client device;

constructing, by the electronic device, a plurality of different search criteria based on the product search request;

conducting, by the electronic device, a plurality of product searches using the plurality of different search criteria, searching for products based on the target product; and returning, by the electronic device, product search results of the plurality of product searches to the client device, causing the client device to display, via the GUI on the client device, the product search results on a second page comprising a plurality of switchable tabs respectively corresponding to the product search results.

15. The electronic device of claim 14, wherein the product search results include similar-product search results comprising similar products based on the target product, where the similar products include products that meet a condition of similarity in visual and/or textual features with the target product; and/or, wherein the product search results include same-product search results obtained for users who focus on the target product and is open to choose from different merchants offering the same products, where the same products include products that have same key features in visual and/or textual characteristics as the target product.

\*    \*    \*    \*    \*